United States Patent
Forcht et al.

(10) Patent No.: US 10,608,369 B2
(45) Date of Patent: Mar. 31, 2020

(54) SERIES MODULE, CONNECTION MODULE AND MODULAR DESIGNED CONTROL ARRANGEMENT

(71) Applicant: FESTO AG & Co. KG, Esslingen (DE)

(72) Inventors: Ralf Forcht, Wendlingen (DE); Eduard Wenske, Kornwestheim (DE); Phillippus Hartmann, Wildberg (DE)

(73) Assignee: FESTO AG & CO. KG, Esslingen (DE)

(*) Notice: Subject to any disclaimer, the term of this patent is extended or adjusted under 35 U.S.C. 154(b) by 0 days.

(21) Appl. No.: 16/316,532

(22) PCT Filed: Jul. 18, 2017

(86) PCT No.: PCT/EP2017/068142
§ 371 (c)(1),
(2) Date: Jan. 9, 2019

(87) PCT Pub. No.: WO2018/019664
PCT Pub. Date: Feb. 1, 2018

(65) Prior Publication Data
US 2019/0245294 A1    Aug. 8, 2019

(30) Foreign Application Priority Data
Jul. 26, 2016   (DE) .................. 10 2016 213 725

(51) Int. Cl.
*H01R 13/514*   (2006.01)
*G05B 19/042*   (2006.01)
*H01R 25/16*    (2006.01)

(52) U.S. Cl.
CPC ......... *H01R 13/514* (2013.01); *G05B 19/042* (2013.01); *H01R 25/162* (2013.01); *G05B 2219/21057* (2013.01); *G05B 2219/25324* (2013.01)

(58) Field of Classification Search
CPC ........................... H01R 13/514; H01R 25/162
See application file for complete search history.

(56) References Cited

U.S. PATENT DOCUMENTS 5,615,106 A * 3/1997 Yoshino ............. G05B 19/0423
                                                              700/19
8,156,965 B2 * 4/2012 Kremser .................. G05B 9/02
                                                               137/560
(Continued)

FOREIGN PATENT DOCUMENTS

DE         19653714 C1       12/1997
DE         10061686 A1        6/2001
DE      102005028735 A1 *    12/2006   ......... G06F 13/4027
(Continued)

*Primary Examiner* — Abdullah A Riyami
*Assistant Examiner* — Nader J Alhawamdeh
(74) *Attorney, Agent, or Firm* — Hoffmann & Baron, LLP

(57) ABSTRACT

A series module for a modular designed control arrangement includes a first series interface and a first bus interface and a second series interface and a second bus interface, wherein a bus communication line is formed between the two bus interfaces and multiple connecting lines are formed between the two series interfaces and wherein the connecting lines are arranged at least partially Z-linked between the two series interfaces.

11 Claims, 2 Drawing Sheets

(56) References Cited

U.S. PATENT DOCUMENTS

| | | | | |
|---|---|---|---|---|
| 8,375,986 B2* | 2/2013 | Miyazoe | ............. | F15B 13/0825 |
| | | | | 137/560 |
| 2014/0312703 A1* | 10/2014 | Forcht | ................ | F15B 13/0839 |
| | | | | 307/80 |

FOREIGN PATENT DOCUMENTS

| | | | | |
|---|---|---|---|---|
| DE | 102005028735 A1 | 12/2006 | | |
| DE | 112013002370 T5 | 1/2015 | | |
| DE | 102014008796 B3 * | 9/2015 | ........... | G05B 19/042 |
| DE | 102014008796 B3 | 9/2015 | | |
| EP | 0692753 A2 * | 1/1996 | ......... | G05B 19/0423 |
| EP | 0692753 A2 | 1/1996 | | |
| EP | 2620820 A2 * | 7/2013 | .......... | F15B 13/0839 |
| EP | 2620820 A2 | 7/2013 | | |
| WO | 2007042090 A1 | 4/2007 | | |
| WO | 2012/122996 A1 | 9/2012 | | |
| WO | 2013/075729 A1 | 5/2013 | | |
| WO | WO-2013075729 A1 * | 5/2013 | .......... | F15B 13/0839 |

* cited by examiner

SERIES MODULE, CONNECTION MODULE AND MODULAR DESIGNED CONTROL ARRANGEMENT

This application claims priority based on an International Application filed under the Patent Cooperation Treaty, PCT/EP2017/068142, filed on Jul. 18, 2017, which claims priority to DE 10 2016 213 725.5 filed on Jul. 26, 2016.

BACKGROUND OF THE INVENTION

The invention relates to a series module for a modular designed control arrangement with a first series interface and a first bus interface and a second series interface and a second bus interface, wherein a bus communication line is formed between the two bus interfaces and multiple connecting lines are formed between the two series interfaces. Furthermore, the invention relates to a connection module for a modular designed control arrangement and also to a modular designed control arrangement itself.

A solenoid valve system is known from DE 11 2013 002 370 T5, in which a plurality of first to third solenoid valve units is divided into a plurality of first to third groups, wherein a safety power source control unit is assigned to these groups in order to control the first to third solenoid valve units for each of the first to control third groups.

SUMMARY OF THE INVENTION

The object of the invention consists in providing a series module, a connection module and a modular designed control arrangement, which enables a flexible arrangement of the series modules in the modular designed control arrangement.

This object is achieved for a series module of the type according to the invention. In this connection it is envisaged that the connecting lines between the two series interfaces are arranged at least partially Z-linked. A Z-linkage is understood here to mean that a connecting line, which is provided for example with a first connection contact within a series of connection contacts of the first series interface, which are arranged in a pre-determinable distribution, is connected to a second terminal contact within a series of connection contacts of the second series interface, which are also arranged in a pre-determinable distribution, in particular with a distribution identical to the first series interface. Such a Z-linkage thereby makes it possible, when multiple series modules are distributed along an array axis, to establish multiple groups of series modules that can be addressed in each case via one of the connecting lines, in particular can be supplied with electrical energy or separated from electrical energy. In this connection it can be envisaged in particular that within a group of series modules, in each case only the first series module arranged along the array row has the Z-linkage for the connecting lines, whereas subsequently arranged series modules within this group have no Z-linkage of the connecting lines. In contrast to connecting lines routed rectilinearly through the series modules, the Z-linkage thus allows the use of similarly formed series modules, thereby limiting a multiplicity of series modules, which is advantageous as regards warehousing and production costs for such series modules and control arrangements formed therefrom. With regard to the bus communication line, which extends between the first bus interface and the second bus interface, in particular within a module housing, no Z-linkage is provided however. Rather, the bus communication line preferably extends through all series modules arranged along the array axis parallel and rectilinear with respect to the alignment axis. The bus communication line can be a single line or a line network. The configuration of the bus communication line depends on the type of bus system which is to be transmitted via the bus communication line. Furthermore, the bus communication line can be designed as a shielded or unshielded structure, which also depends on the type of bus system. Moreover, it can be envisaged that the bus interface is in each case an integral part of the series interface, alternatively a discrete configuration of the bus interface on a module housing can be envisaged, which is optionally provided and on the outer surfaces of which can be arranged the bus interfaces and series interfaces. A connecting line can be envisaged for providing an electrical potential to an electrical consumer and may be referred to as a supply line. A connecting line may alternatively be envisaged for providing an electrical signal to the electrical consumer and may be referred to as a signal line. Multiple connecting lines may optionally include only supply lines or only signal lines or a combination of both types of lines.

Advantageous developments of the invention are the subject of the dependent claims.

It is expedient if in each case a connection contact is assigned to two of the connecting lines in order to form a consumer interface, which is designed for the connection of an electrical consumer. In this case the electrical consumer can be integrated for example in a module housing of the series module, wherein in this case either a pluggable coupling of the electrical consumer to the consumer interface or a cohesive coupling of the consumer to the consumer interface, in particular by soldering, can be envisaged. Alternatively the connection contacts, which are assigned to the connecting lines, can be guided to an outer surface of a module housing of the series module, where they enable an electrical or electromechanical coupling of the load. Alternatively it is envisaged that multiple series modules are accommodated with or without associated consumers in a common module housing. The electrical consumer can in particular be an electromechanical valve, preferably a solenoid valve or a piezo valve, or an electromechanical actuator, in particular a magnetic actuator or an electric motor. In this connection it is envisaged that the electrical consumer is then brought into operation when a sufficient electrical potential difference exists between the two connecting lines, which is made available as long as the electrical consumer is to be operated and its switching off inevitably leads to the switching off of the electrical consumer.

In a development of the invention it is envisaged that in each case at least one connection contact is assigned to the bus communication line as well as to two of the connecting lines, in order to form a consumer interface that is designed to connect an electrical consumer. In this case it is assumed that in a normal operating state of the series module, which can be integrated in a corresponding modular designed control arrangement, the two connecting lines are permanently supplied with electrical potentials, and that the electrical consumer comprises a bus communication circuit which is designed to evaluate bus communication signals that are transmitted via the bus communication line. The bus communication line may comprise multiple cores, in this case multiple connection contacts are preferably also provided. From the evaluated bus communication signals the bus communication circuit generates suitable drive signals for a power stage associated with the electrical consumer, such that this power stage can optionally use the electrical potentials provided at the connecting lines to operate the electrical consumer or blocks these electrical potentials to prevent an operation of the electrical consumer. Such an electrical consumer can be designed for example as an electromechanical valve or electromechanical drive.

It is advantageous if a bus communication circuit is connected to the bus communication line, which is designed to connect the bus communication line to multiple signal lines, and that the signal lines are connected, in particular exclusively, to one of the two series interfaces. The signal lines are electrical lines which can be provided optionally for an independent supply of connected electrical consumers or, in combination with connecting lines, for an electrical supply of electrical consumers. The signal lines are preferably used to control electrical consumers that do not have their own bus communication circuit, as is the case for example with simply constructed electrical consumers such as solenoid valves or piezo valves. In this way, in the case of an array of a plurality of series modules, a plurality of simply constructed electrical consumers can be controlled in an independent manner. In particular, the provision of electrical energy to the multiple signal lines by means of the associated bus communication circuit provides an advantageous supply to subsequently arranged series modules, which for their part are each designed for the connection of the simply constructed electrical consumers.

It is advantageous if the bus communication circuit is connected to two of the connecting lines in order to ensure an electrical supply of the bus communication circuit. In this case the bus communication circuit, which for its part is provided for a control of one or more, in particular simply constructed, electrical consumers, can be supplied within a predetermined zone of the modular designed control arrangement selectively with electrical energy or can be cut off from this energy, whereby in particular safety-related functions can be accomplished within the modular designed control arrangement.

In an advantageous development of the invention it is envisaged that the connecting lines form multiple pairs of connecting lines, which in each case comprise one, in particular Z-linked, ground line and one, in particular Z-linked, supply line. This enables the provision of individual voltage levels at the groups of series modules connected to the respective connecting line pair and the associated electrical consumers. This may be of interest on the one hand with regard to safety-related applications, since the pairs of connecting lines pairs can supply the assigned series modules independently of one another with electrical energy or the respective electrical power supply for the respective group of series modules can be shut off without influencing other electrical consumers that are connected to series modules that in turn are connected to other pairs of connecting lines. In addition a two-channel shutdown of the connected electrical consumers is enabled in this way for the respective group of series modules, since both the supply line and the ground line can be influenced without thereby affecting other groups of series modules.

In this way a higher level of security within a predetermined safety category for the respective series module can be achieved.

The object of the invention is achieved for a connection module according to the invention. In this case the connection module comprises a bus communication interface which is designed for connection to a higher-level control, a supply interface which is designed for connection to an electrical source, a combination interface which includes a bus interface and a series interface and which is designed for connection to a series module according to the invention, wherein a bus communication line is formed between the bus communication interface and the bus interface, and wherein at least two pairs of supply lines are formed between the supply interface and the series interface, which in each case comprise a ground line and a power supply line, so as to form at least two supply paths independent of one another for series modules. Such a connection module is envisaged for a connection to multiple series modules and serves for the coupling and also for the provision of bus communication signals, electrical supply voltages and optionally analogue signals, as are used in particular for simply constructed electrical consumers that are associated with the series modules. The bus communication interface of the connection module is preferably identical to the bus interface, as it is formed on the combination interface of the connection module and as it is envisaged in the same manner also on the series modules. In this case it is assumed that a bus communication signal is looped through the connection module without a conversion of the communication protocol, and optionally information in the connection module is read from the bus communication signal or entered into the bus communication signal. Alternatively it can be envisaged that the connection module is designed in the manner of a bus node, in which a bus communication signal that is provided at the bus communication interface experiences in the connection module a conversion from a first bus communication protocol to a second bus communication protocol, which is then provided at the bus interface of the combination interface. In this case too it can be envisaged that in the connection module there takes place a reading of the bus communication signal for internal purposes and/or writing information into the bus communication signal based on information from the connection module. The supply interface assigned to the connection module enables electrical energy to be supplied to the connection module, wherein this electrical energy is forwarded in a pre-determinable manner to the at least two pairs of supply lines of the connection module. Optionally the supply interface is designed for connection to exactly one electrical source or to a plurality of electrical sources, wherein this depends in particular on the level of security that is to be maintained with the connection module within a pre-definable safety category. Furthermore, the configuration of the supply interface depends on which electrical consumers are to be connected to the associated series modules. The combination interface formed at the connection module is intended for the coupling of a series module and accordingly includes a bus interface and also a series interface, which may be designed structurally separate or combined. The at least two pairs of supply lines provided at the series interface of the combination interface of the connection module enable at least two mutually independent electrical voltages to be provided between the respective ground line and the respective voltage supply line, with which at least two different supply voltage groups can be formed within the downstream arrayed series modules, which optionally can be provided separated and disconnected from one another.

In an advantageous development of the connection module, it is envisaged that at least one switch for interrupting the electrical connection between the supply interface and the series interface is assigned to at least one, in particular each, supply line. With the switch a targeted deactivation of at least one, preferably several, supply lines within the connection module can be carried out, in particular depending on a bus communication signal that is transmitted via the bus communication line in the connection module, in order thereby to be able to influence an energy supply of groups of series modules that are arrayed on the connection module.

This is in particular of interest when the connection module is used in a modular designed control arrangement, which is used to control a complex machine or device with different machine or device groups. In this case it may be envisaged that only parts of the machine or device are shut down in the event of a safety-related influence on the machine or device, while other parts of the device should remain in operation. Preferably it is envisaged that a switch is assigned to each of the supply lines, in order to be able to fully influence all series modules arranged downstream on the connection module. Furthermore it is envisaged that the switches meet a pre-determinable safety level within a pre-determinable safety category, and in particular allow through their construction or a redundant arrangement of switches a safe disconnection of supply voltages.

In a further embodiment of the invention it is envisaged that a bus communication circuit is connected to the bus communication line, which circuit is designed to connect the bus communication line to multiple signal lines, and that the signal lines are connected to the series interface.

In an advantageous development of the connection module, it is envisaged that at least two of the pairs of connecting lines are each assigned a separately formed supply connection for an external feed of a supply voltage. In this way different groups of series modules, which are arrayed on the connection module, are supplied with different and mutually independent electrical voltages. A provision of these electrical supply voltages can be carried out in particular via discretely formed supply voltage interfaces.

The object of the invention is achieved by a modular designed control arrangement according to the invention. This modular designed control arrangement is provided for controlling multiple electrical consumers and comprises a connection module according to the invention, multiple series modules arrayed on the connection module according to the invention, and also in each case electrical consumers associated with the series modules, selected from the group: switching valve, valve with integrated sensor, proportional valve, electromechanical actuator.

BRIEF DESCRIPTION OF THE DRAWINGS

An advantageous embodiment of the invention is illustrated in the drawing, in which.

DETAILED DESCRIPTION OF THE PREFERRED EMBODIMENTS

Figure 1:
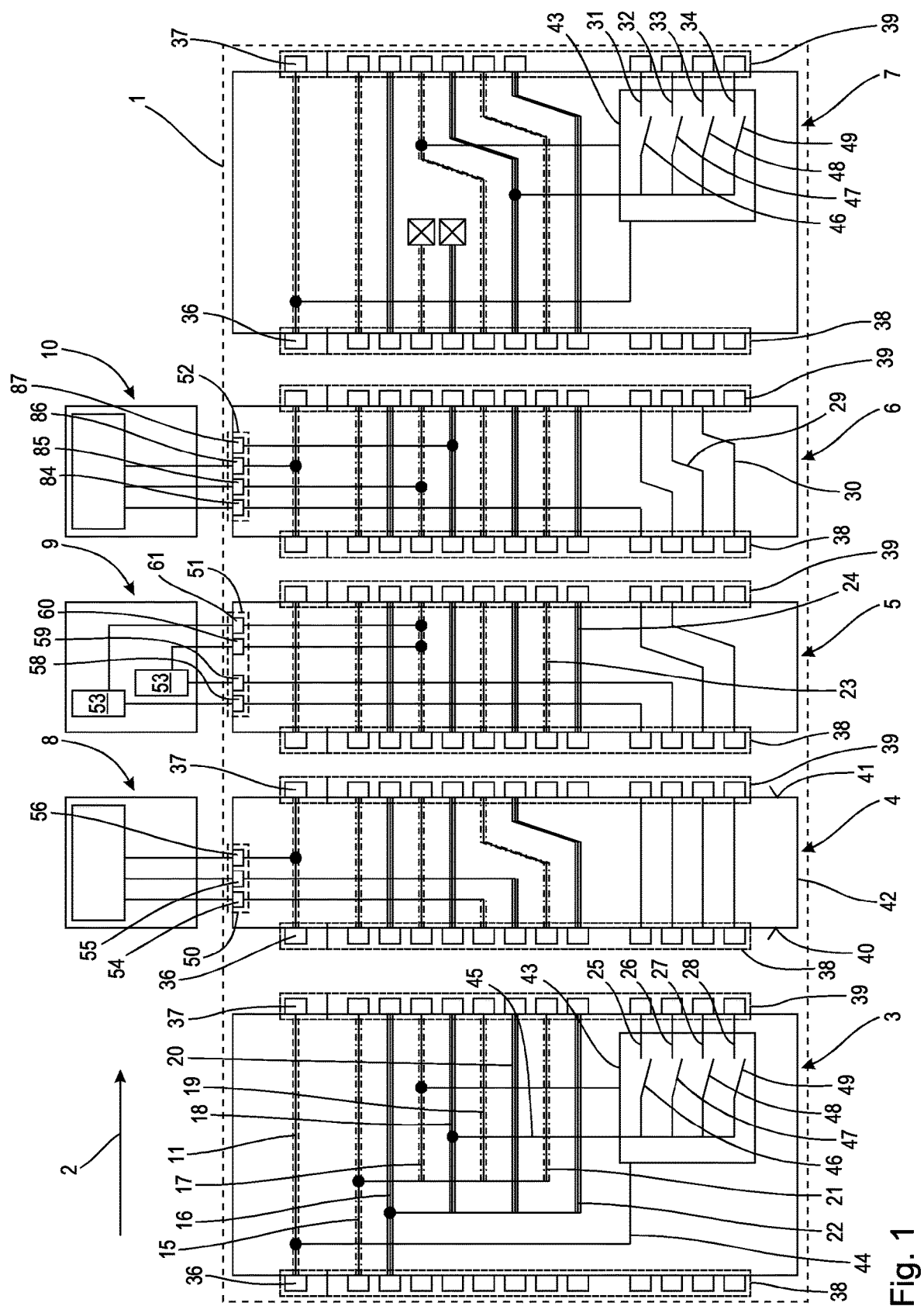
FIG. 1 is a schematic representation of a modular designed control arrangement with a connection module, multiple series modules, as well as electrical consumers.

A control arrangement 1 shown in FIG. 1, which may be part of an automation system not shown in more detail, which is provided for example for operating a complex technical installation using a plurality of electrically or pneumatically operated actuators, comprises multiple modules arranged along an array axis 2. The modules are a connection module 3 and several series modules 4, 5, 6, 7. In each case electrical consumers 8, 9 and 10 are connected to the series modules 4, 5 and 6. For example, the electrical consumer 8 is designed as a proportional valve, the electrical consumer 10 is designed as a valve with an integrated sensor, and the electrical consumer 9 comprises two switching valves 53. For reasons of clarity, a representation of fluid lines that are connected to the respective valves is omitted.

Purely by way of example, the connection module 3 and also the series modules 4, 5, 6, 7 comprise electrical lines, which are described in more detail hereinafter. It can however also be envisaged that the connection module as well as the series modules in a variant not shown in more detail also include fluidic lines, in particular a supply line and an exhaust line.

The electrical lines envisaged in the connection module 3 and also in the series modules 4, 5, 6, 7 can be divided into three different groups. The first line group is formed by the bus communication line 11, which extends through the connection module 3 and also through all the series modules 4, 5, 6, 7 parallel to the array axis 2 and connects the connection module 3 as well as all the series modules 4, 5, 6, 7 to one another. Purely by way of example, it is envisaged that the bus communication line 11 is looped in an uninterrupted manner through each of the series modules 4, 5, 6, 7. In an embodiment not shown in more detail, it may be envisaged that the bus communication line, which may comprise one or more conductors, is routed at least in a series module to a consumer interface and is looped through the consumer; this is also referred to as a daisy chain arrangement.

Furthermore, the connection module 3 and the series modules 4, 5, 6, 7 comprise in each case multiple connecting lines, which belong either to a second group of lines, namely the supply lines, or to a third group of lines, namely the signal lines.

By way of example it is envisaged that the supply lines are in each case arranged in pairs and in particular comprise a live line and a ground line. In order to clarify the run of the supply lines, in each case the same reference numerals are used below for the connection module 3 and for all series modules 4, 5, 6, 7 as are used for those supply lines that are coupled together electrically. Thus, on the basis of the run of the supply lines through the connection module 3 and also the series modules 4, 5, 6, 7, purely exemplary supply lines 15, 16, 17, 18, 19, 20, 21, 22, 23, 24 are envisaged.

Furthermore, with regard to the signal lines belonging to the third group of lines, the result is that signal lines 25, 26, 27, 28, 29, 30, 31, 32, 33, 34 are present here.

The connection module 3 comprises a first bus interface 36, a second bus interface 37, a first series interface 38 and also a second series interface 39. The first bus interface 36 may also be referred to as a bus communication interface, since it is designed for connection to a higher-level controller. The first series interface 38 may also be referred to as a supply interface, since it is designed for connection to an electrical source, not shown. The second bus interface 37 and the second series interface 39 may also be referred to as a combination interface. The bus interfaces 36, 37 as well as the series interfaces 38, 39 are in the connecting module 3 and also in the series modules 4, 5, 6, 7 attached to opposing end faces 40, 41 of a module housing 42.

Purely by way of example, it is envisaged that the connection module 3 and the series modules 4, 5, 6, 7 in each case have the same interfaces at least from the electromechanical aspect. In a variant of the connection module, not shown in more detail, this can also have a different electromechanical interface configuration on the input side.

In the case of the connection module 3, the first bus interface 36 serves for the connection to an upstream bus subscriber, which may optionally be a bus node or a higher-level control, in particular a storage programmable controller (SPC). In either case a bus communication signal is provided at the first bus interface 36 by the higher-level controller or the bus node, which is passed along the array axis 2 through all the series modules 3, 4, 5, 6, 7. In this connection it can be envisaged that the series modules 3, 4, 5, 6, 7 access in an individual manner the bus communication signal transmitted via the bus communication line 11 and perform relevant read and/or write operations, in order for example to extract for their own operation parameters or commands from the bus communication signal, or to pass on information for other bus subscribers, in particular higher-level control device, to the bus communication signal.

The first and second bus interfaces 36, 37 of all series modules 3, 4, 5, 6, 7 are for example of identical design, so that no different connection means, for example different connectors, have to be used.

The series interfaces 38 and 39 provided on the series modules 4, 5, 6, 7 are likewise designed to be compatible with one another in electromechanical terms, wherein the allocation of connection contacts at the individual series interfaces 38 and 39, which are assigned to the respective series modules, can differ.

In the case of the connection module 3, it is envisaged by way of example that the series interface 38 has, purely by way of example, only two connection contacts, not shown in more detail, which are connected to associated supply lines 15, 16, with which a supply of electrical energy to the connection module 3 can be effected. The remaining plug-in locations, not shown slots, in the series interface 38 of the connection module 3 are not connected however. On the other hand, in the case of the series interface 39 of the connection module 3, which faces the following series module 4, all connection contacts, not shown in more detail, are connected to associated supply lines 15 to 22 and also to signal lines 25 to 28. Thus, the electrical potentials or signals present there can be passed on to series modules 4 to 7 arranged downstream along the array axis 2. By way of example, in the case of the connection module 3 it is envisaged that the supply line 15 is connected to the supply lines 17, 19 and 21. Furthermore, the supply line 16 is connected to the further supply lines 18, 20 and 22. In this way the electrical potentials provided in each case at the supply lines 15 and 16 can be provided at the respectively assigned supply lines 17, 18, 19, 20, 21, 22.

Furthermore, a bus communication circuit 43 is provided in the connection module 3, which is in particular a microprocessor or microcontroller. The bus communication circuit 43 is connected via a communication line 44 to the bus communication line 11 and is further connected via a coupling line 45 purely by way of example to the supply line 18. Multiple switches 46 to 49s are formed in the bus communication circuit 43. These switches 46 to 49 can in each case be changed individually in their switching state according to a program stored in the bus communication circuit depending on a bus communication signal provided through the communication line 44. In this way electrical connections between the coupling line 45 and the respectively associated signal line 25, 26, 27, 28 can optionally be formed or interrupted. In this connection the signal lines 25, 26, 27, 28 are provided in the same way as the supply lines 15, 16, 17, 18, 19, 20, 21, 22 at the series interface 39 of the connection module 3.

The supply lines 15, 16, 17, 18, 19, 20, 21, 22 of the connection module 3 should in each case be considered in pairs, and serve to supply groups of series modules 4 to 7 arranged downstream along the array axis 2. By way of example, it is envisaged that in each case one supply line 15, 17, 19, 21 of a respective pair of supply lines serves as ground line, while the other supply line 16, 18, 20, 22 of the supply line pair is live. By way of contrast, the signal lines 25, 26, 27, 28 in the connection module 3 are envisaged for the individual supply of individual consumers, for example the consumer 9 and 10.

In the case of the following series module 4 being the first, purely by way of example, on the connection module 3, it is envisaged by way of example that apart from the bus communication line 11, also all signal lines 25, 26, 27, 28 unchanged between the first bus interface 36 and first series interface 38 and the second bus interface 37 and second series interface 39, are guided through the series module 4. On the other hand, it is envisaged purely by way of example with respect to the supply lines 19 and 20 that these are guided starting from the first series interface 38 within the series module 4 to a consumer interface 50 and there form connection contacts 54, 55, which can be utilised to supply the electrical consumer 8 formed for example as a proportional valve. Furthermore, also at least one connection contact 56 for a connection to the bus communication line 11 is provided on the consumer interface 50, so that bus communication signals of the bus communication line 11 can be provided at the electrical consumer 8. In this case it is assumed that the electrical consumer 8 has its own intelligence, in particular in the form of a microprocessor or microcontroller, not shown. This intelligence is designed to convert incoming bus communication signals in such a way that a control process for the proportional valve, not shown in more detail, of the electrical consumer 8 can be carried out. The two supply lines 21 and 22 are arranged in the series module 4 as a Z-link, and emerge at the second series interface 39 at those connection points at which the supply lines 19 and 20 are connected to the first series interface 38 of the series module 4, and for the following series module 5 are thus connected at the location of the supply lines 19 and 20 to its first series interface 38.

The second series module 5, arranged purely by way of example on the first series module 4, differs from the first series module 4 in that, for example, all the supply lines that extend between the first series interface 38 and the second series interface 39 are in each case guided through the series module 5 rectilinearly and parallel to the array axis 2. Since there is no electrical connection between the connection module 3 and the two lower supply lines of the first series interface 38 on account of the arrangement of the second series module 5 downstream of the first series module 4, the supply lines connected to the first series interface 38 of the second series module 5 are provided with the reference numerals 23 and 24. When the second series module 5 is used in the arrangement according to FIG. 1, these two supply lines remain purely by way of example without a supply voltage. On the other hand, it can be envisaged that these supply lines 23, 24 can conduct electrical potentials in another arrangement of the series module 5, in particular in the case of a direct mounting on the connection module 3. In the second series module 5 a consumer interface 51 with a total of four connection contacts 58, 59, 60, 61 is furthermore provided, wherein the connection contacts 58 and 59 are directly connected to the signal lines 25 and 26, while the two other connection contacts 60 and 61 are connected for example to the supply line 17. In the associated electrical consumer 9 the switching valves 53 provided purely by way example are in each case connected between the associated signal line 25 and 26 and the associated supply line 17. Accordingly, with a suitable control of the bus communication circuit 43 a closure of the switches 46 and 47 in the connection module can be effected by a corresponding bus communication signal and a flow of current flow can be produced by the respective switching valves 53, provided that a ground potential is provided at the same time at the supply line 17. The two switching valves 53 can thus change their switching state and can for example block or release a flow of fluid. Since in series module 5 the two signal lines 25 and 26 are branched off to the associated consumer interface 51, the further signal lines 27 and 28 in the series module 5 are arranged as a Z-linkage, so that in the second series interface 39 they occupy the places of the two signal lines 25 and 26 at the first series interface 38.

In the case of the third series module 6 it is envisaged that the electrical consumer 10, which is formed purely by way of example as a valve with an integrated sensor, not shown, is connected at the consumer interface 52 with the connection contacts 84, 85, 96 and 87 on the one hand directly to the signal line 27, and on the other hand is connected directly to the supply lines 17 and 18 as well as to the bus communication line 11. In this way it can be achieved for example that the electrical consumer designed as a valve with an integrated sensor, which thus has four connections, when starting from a no-current/no-energy neutral position then adopts a switching position only if there is an electrical supply via the signal line 27 and the supply lines 17 and 18 are present. Furthermore, the consumer 10 can provide a sensor signal of the integrated sensor, not shown, which can for example be a pressure sensor, to a suitable receiver via the bus communication line 11. The remaining signal lines 28, 29 and 30 provided in the third series module 6 are Z-linked between the first series interface 38 and the second series interface 39.

By way of example, the consumer 8 is thus envisaged as a consumer that can be influenced by bus communication signals, which are provided via the bus communication line 11 and which are supplied via the supply lines 19 and 20.

Furthermore, by way of example the consumer 9 is envisaged as a consumer whose switching valves 53 are in each case connected to one of the control lines 25, 26 and to the supply line 17, and can be activated and deactivated in this way.

A consumer is shown by way of example by the consumer 10, which is supplied via the supply lines 17 and 18 and can receive a switching signal via the control line 27 and furthermore can provide a sensor signal to a suitable receiver via the bus communication line 11.

The fourth series module 7 is designed by way of example of a variant of the connection module 3 and is envisaged for the arrangement on a previous series module, for example, from the group of series modules 4, 5, 6. The series module 7 has, purely by way of example, no associated consumer, but instead is provided to forward the bus communication line 11 and at least parts of the supply lines 15, 16, 21, 22, 23, 24 to at least one further series module, not shown, arranged downstream along the array axis 2. Furthermore, the fourth series module 7 is designed to provide new signals, using bus communication signals from the bus communication line 11, which are provided via the communication line 44 to the bus communication circuit 43, as well as using a ground potential applied to the supply line 22 at signal lines 31 to 34, depending on the switching positions of the switches 46 to 49.

Figure 2:
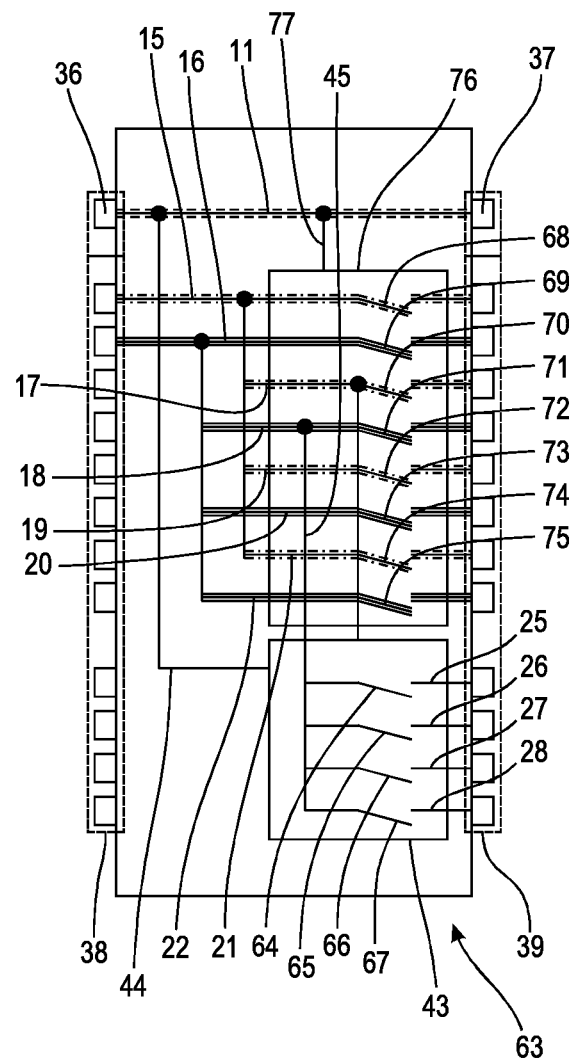
FIG. 2 is a schematic representation of a second embodiment of a connection module.

In a variant of a connection module 63 illustrated in FIG. 2, the same reference numerals as in the connection module are used for functionally identical components. The connection module 63 differs from the connection module 3 in that the signal lines 25, 26, 27, 28 as well as the supply lines 15, 16, 17, 18, 19, 20, 21, 22 are each assigned switches 46, 47, 48, 49, 68, 69, 70, 71, 72, 73, 74, 75. In this connection the switches 46, 47, 48, 49 belong to the bus communication circuit 43 already known from FIG. 1 and allow the specific, for example not safety-related, influencing of the signal lines 25, 26, 27 and 28. Furthermore, the connection module includes a further bus communication circuit 76 with associated switches 68, 69, 70, 71, 72, 73, 74, 75, which allow a targeted, in particular in each case pairwise, for example safety-related shutdown of the supply lines 15 to 22 or of the pairs of supply lines 15 and 16; 17 and 18; 19 and 20; 21 and 22 allow.

For example, the bus communication circuit 76 can be configured so that the pairs of supply lines 15 and 16; 17 and 18; 19 and 20; 21 and 22 can, depending on an in particular safety-related, bus communication signal, which is provided via the bus communication line 11 and also the associated communication line 77 to the bus communication circuit 76, be switched optionally and independently of other pairs of supply lines between an electrically conductive state and an electrically non-conductive state can be switched.

By these measures supply voltages for the series modules 4, 5, 6, 7, not shown in FIG. 2, which can be installed downstream on the connection module 63, which in practice can be formed in at least virtually any other arrangement and with other configurations as regards the associated consumers, can be grouped into supply voltage zones that can in particular be switched off for safety reasons, which can be selectively switched off by the bus communication circuit 76.

Accordingly, safety-related functions, in particular safety-related groups of series modules 4, 5, 6, can be realised with a control arrangement 1 formed in this way using the connection module 63.

In an embodiment, not shown, the two bus communication circuits 43 and 76 are combined to form a common bus communication circuit.

The invention claimed is:

1. A series module for a modular designed control arrangement, comprising a first series interface and a first bus interface and a second series interface and a second bus interface, wherein, between the first bus interface and the second bus interface, a bus communication line is formed and wherein, between the first series interface and the second series interface, multiple connecting lines are formed, wherein the connecting lines between the first series interface and the second series interface are arranged at least partially Z-linked, wherein the connecting lines form multiple pairs of connecting lines, each pair of connecting lines comprising a ground line and a supply line, and
wherein both the ground line and the supply line of one line pair are completely independent from another line pair of the same series module.

2. The series module according to claim 1, wherein two of the connecting lines are in each case assigned a connection contact in order to form a consumer interface, which is designed to connect an electrical consumer.

3. The series module according to claim 1, wherein the bus communication line as well as two of the connecting lines, are in case each assigned at least one connecting contact, in order to form a consumer interface, which is designed to connect an electrical consumer.

4. The series module according to claim 1, wherein a bus communication circuit is connected to the bus communication line, which circuit is designed for the logical coupling of the bus communication line to multiple signal lines, and wherein the signal lines are connected to one of the two series interfaces.

5. The series module according to claim 4, wherein the bus communication circuit is connected to two of the connecting lines in order to provide an electrical supply to the bus communication circuit.

6. The series module according to claim 1, wherein the ground line and the supply line are Z-linked.

7. A connection module for a modular designed control arrangement, with a bus communication interface, which is designed for connection to a higher-level control, with a supply interface, which is designed for connection to an electrical source, and with a combination interface, which comprises a bus interface and a series interface and which is designed for connection to a series module, wherein a bus communication line is formed between the bus communication interface and the bus interface, and wherein at least two pairs of supply lines are formed between the supply interface and the series interface, which in each case comprise a ground line and a power supply line, in order to form at least two independent supply paths for series modules, and wherein both the ground line and the supply line of one line pair are completely independent from another line pair of the same series module.

8. The connection module according to claim 7, wherein at least one supply line is assigned at least one switch for interrupting the electrical connection between the supply interface and the series interface.

9. The connection module according to claim 7 wherein a bus communication circuit is connected to the bus communication line, which circuit is designed for the logical coupling of the bus communication line to multiple signal lines, and wherein the signal lines are connected to the series interface.

10. The connection module according to claim 7, wherein at least two of the pairs of connecting lines are in each case assigned a separately formed supply connection for an external supply of a power supply voltage.

11. A modular designed control arrangement for controlling multiple electrical consumers with a connection module and comprising multiple series modules each series module comprising a first series interface and a first bus interface and a second series interface and a second bus interface, wherein between the first bus interface and the second bus interface a bus communication line is formed and wherein between the first series interface and the second series interface multiple connecting lines are formed, wherein the connecting lines between the first series interface and the second series interface are arranged at least partially Z-linked and wherein the connecting lines form multiple pairs of connecting lines, which in each case comprise a ground line and a supply line, which series modules are arranged on the connection module, and also comprising in each case electrical consumers from the group: switching valve, proportional valve, valve with integrated sensor, electromechanical actuator, being assigned to the series modules.

* * * * *